US011947304B2

(12) United States Patent
Ideura et al.

(10) Patent No.: US 11,947,304 B2
(45) Date of Patent: Apr. 2, 2024

(54) CLEANING DEVICE AND IMAGE FORMING APPARATUS

(71) Applicant: FUJIFILM Business Innovation Corp., Tokyo (JP)

(72) Inventors: Haruyuki Ideura, Kanagawa (JP); Daisuke Tanaka, Kanagawa (JP); Takeshi Yasuda, Kanagawa (JP); Kaoru Matsushita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/948,546

(22) Filed: Sep. 20, 2022

(65) Prior Publication Data

US 2023/0305480 A1 Sep. 28, 2023

(30) Foreign Application Priority Data

Mar. 25, 2022 (JP) ................................. 2022-050477

(51) Int. Cl.
*G03G 21/00* (2006.01)
*G03G 15/16* (2006.01)

(52) U.S. Cl.
CPC ....... *G03G 21/0035* (2013.01); *G03G 15/161* (2013.01); *G03G 2215/1661* (2013.01); *G03G 2221/0005* (2013.01)

(58) Field of Classification Search
CPC ............. G03G 21/0035; G03G 15/161; G03G 2215/1661; G03G 2221/0005
See application file for complete search history.

(56) References Cited

U.S. PATENT DOCUMENTS 5,031,000 A * 7/1991 Pozniakas .......... G03G 21/0005 399/349

FOREIGN PATENT DOCUMENTS

| | | | |
|---|---|---|---|
| JP | H05-107997 | A | 4/1993 |
| JP | 2005-257844 | A | 9/2005 |
| JP | 2012-237787 | A | 12/2012 |

* cited by examiner

*Primary Examiner* — Stephanie E Bloss
*Assistant Examiner* — Michael A Harrison
(74) *Attorney, Agent, or Firm* — Oliff PLC

(57) ABSTRACT

A cleaning device includes: a cleaning brush that has bristles that rotate and contact a surface, to which toner has adhered, of a cleaning member to be cleaned, the cleaning brush removing the toner adhered to the surface of the cleaning member; a first contact member that contacts the bristles without a position of the first contact member relative to a position of the cleaning brush being changed; and a second contact member that contacts the bristles at a location downstream from the first contact member in a direction of rotation of the cleaning brush and without a position of the second contact member relative to the position of the cleaning brush being changed, and that is disposed on an extension line extended from a line between an axial center of the cleaning brush and a base of the bristles that move away from the first contact member.

20 Claims, 7 Drawing Sheets

CLEANING DEVICE AND IMAGE FORMING APPARATUS

CROSS-REFERENCE TO RELATED APPLICATIONS

This application is based on and claims priority under 35 USC 119 from Japanese Patent Application No. 2022-050477 filed Mar. 25, 2022.

BACKGROUND

(i) Technical Field

The present disclosure relates to a cleaning device and an image forming apparatus.

(ii) Related Art

Japanese Unexamined Patent Application Publication No. 2005-257844 discloses an image forming apparatus in which, after a surface of an image carrier that rotates in a prescribed direction has been charged in a charging region where the surface is charged, the surface of the image carrier is illuminated with exposure light to obtain an electrostatic latent image on the surface of the image carrier, the electrostatic latent image is developed with toner to form a toner image on the surface of the image carrier, and the toner image is transferred to a transfer surface in a transfer region, which is a region where the toner image is transferred to the transfer surface, to finally fix the toner image to a recording medium, as a result of which an image formed from the fixed toner image is formed on the recording medium. The image forming apparatus includes a plate-shaped cleaning blade, a solid lubricant, a rotating brush, and flicking members. The cleaning blade is disposed downstream from the transfer region in a direction of rotation of the image carrier and upstream from the charging region in the direction of rotation of the image carrier, and has an end that press-contacts the surface of the image carrier and that scrapes off residue from the surface of the image carrier. The solid lubricant is applied to the surface of the image carrier. The rotating brush is disposed downstream from the transfer region in the direction of rotation of the image carrier and upstream from the cleaning blade in the direction of rotation of the image carrier, and applies the lubricant to the surface of the image carrier by rotating in the prescribed direction via two regions, that is, a region that contacts the surface of the image carrier and a region that contacts the solid lubricant. The flicking members are disposed side by side in a direction of rotation of the rotating brush and knock off anything that has interfered with and that has adhered to the brush.

Japanese Unexamined Patent Application Publication No. 2012-237787 discloses a cleaning device that includes a cleaning brush roller, a collecting member, and a brush contact member. The cleaning brush roller includes a brush roller unit including a rotatable rotary shaft member and naps that are caused to stand on a peripheral surface of the rotary shaft member, and scrapes off by the brush roller unit anything that has adhered to a surface of a cleaning body to be cleaned. The collecting member rotates while in contact with the brush roller unit with a collection bias being applied thereto, to thereby move anything that has adhered inside the brush roller unit to its own surface for collecting it. The brush contact member is disposed so as to contact, of an entire region of the brush roller unit in a peripheral direction, a region that has moved to a prescribed rotation position. In the cleaning device, after the naps have been temporarily flexed at the position of contact between the brush roller unit and the brush contact member, the naps are restored to their original orientation at once due to the stiffness of the naps that have passed the contact position, to thereby shake off from the brush roller unit anything that has adhered and that has been trapped inside the brush roller unit. In addition, in the cleaning device, of the entire region of the brush roller unit in the peripheral direction, the brush contact member is brought into contact with a region after passage of the position of contact with the cleaning body and before entry to the position of contact with the collecting member.

Japanese Unexamined Patent Application Publication No. 05-107997 discloses a cleaning device having a brush that rotates in contact with a surface of a toner image carrier, and a toner remover that removes toner that has adhered to the brush. The toner remover includes toner scraping bars, and a movable support that supports the toner scraping bars and that circulates and moves each toner scraping bar to a toner scraping position prescribed so that an amount of interference with a brush changes.

SUMMARY

Aspects of non-limiting embodiments of the present disclosure relate to a cleaning device and an image forming apparatus, which suppress a reduction in toner removal performance compared with a structure in which bristles of a cleaning brush contact a downstream contact member after the bristles are restored from their deformed states resulting from contact of the bristles of the cleaning brush with an upstream contact member.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a cleaning device including: a cleaning brush that has bristles that rotate and contact a surface, to which toner has adhered, of a cleaning member to be cleaned, the cleaning brush removing the toner adhered to the surface of the cleaning member; a first contact member that contacts the bristles without a position of the first contact member relative to a position of the cleaning brush being changed; and a second contact member that contacts the bristles at a location downstream from the first contact member in a direction of rotation of the cleaning brush and without a position of the second contact member relative to the position of the cleaning brush being changed, and that is disposed on an extension line extended from a line between an axial center of the cleaning brush and a base of the bristles that move away from the first contact member.

BRIEF DESCRIPTION OF THE DRAWINGS

Exemplary embodiments of the present disclosure will be described in detail based on the following figures, wherein.

DETAILED DESCRIPTION

Examples of exemplary embodiments of the present disclosure are described below on the basis of the drawings. Note that arrow H shown in each figure denotes a vertical direction, and arrow W denotes an apparatus width direction that is a horizontal direction.

FIRST EXEMPLARY EMBODIMENT

Structure of Image Forming Apparatus 10

Figure 1:
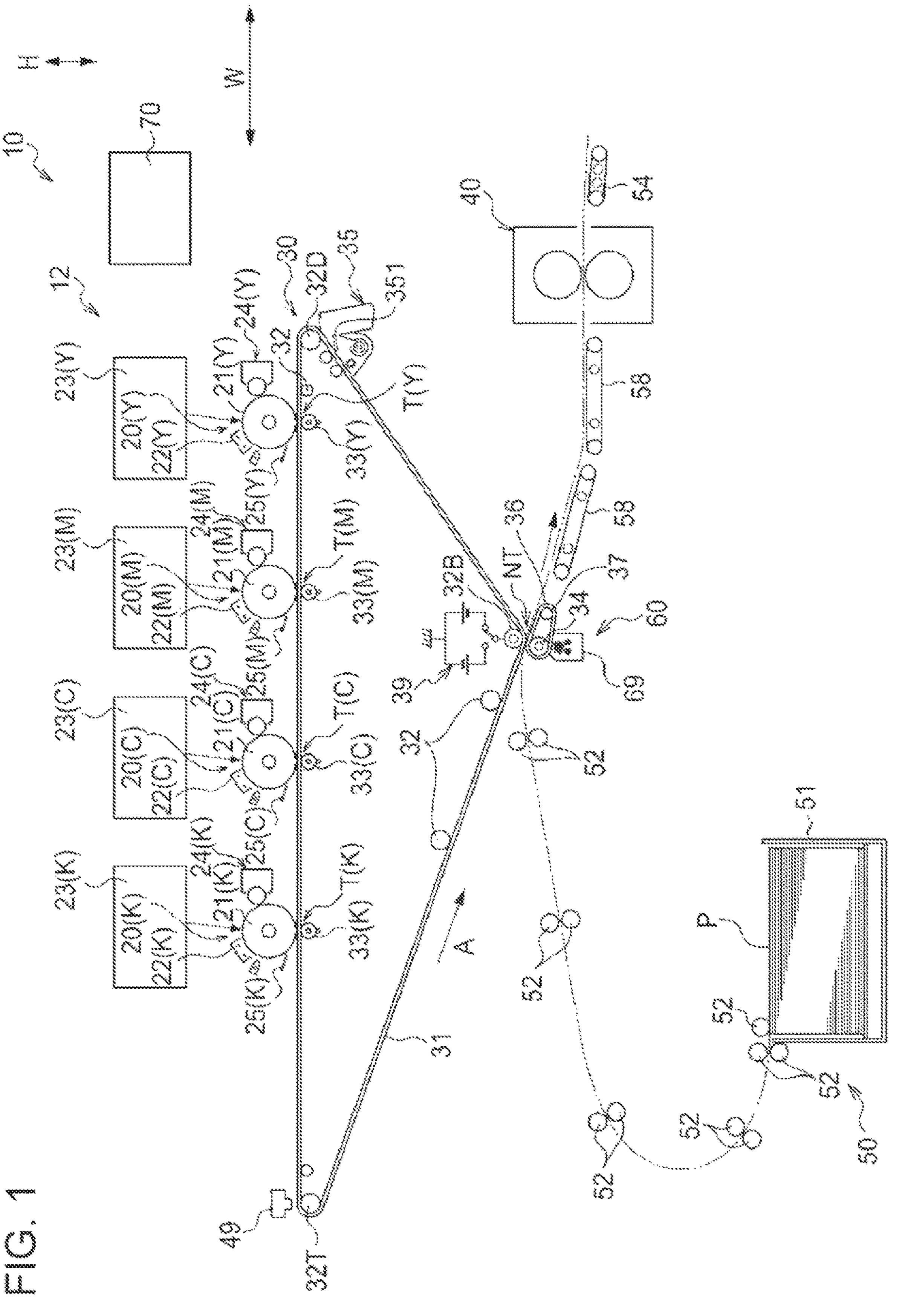
FIG. 1 is a schematic view of a structure of an example of an image forming apparatus including a cleaning device according to a first exemplary embodiment when seen from the front.

FIG. 1 is a schematic view of a structure of an example of an image forming apparatus 10 including a cleaning device 60 according to a first exemplary embodiment. As shown in FIG. 1, the image forming apparatus 10 has an image forming unit 12 that forms an image on a recording medium P, such as a sheet, by an electrophotographic system, a transport device 50 that transports the recording medium P, and a controller 70 that controls the operation of each portion of the image forming apparatus 10.

Transport Device 50

As shown in FIG. 1, the transport device 50 has an accommodation unit 51 that accommodates recording media P and transport rollers 52 that transport the recording media P from the accommodation unit 51 toward a second-transfer position NT. The transport device 50 further has transfer belts 58 that transport the recording media P from the second-transfer position NT toward a fixing device 40, and a transport belt 54 that transports the recording media P from the fixing device 40 toward a discharge unit (not shown) of the recording media P.

Image Forming Unit 12

The image forming unit 12 has toner image forming units 20 that form toner images, a transfer device 30 that transfers onto a recording medium P the toner images formed by the toner image forming units 20, and the fixing device 40 that heats and presses the toner images transferred to the recording medium P and fixes the toner images to the recording medium P.

The toner image forming units 20 are provided so as to form toner images each according to color. In the exemplary embodiment, the toner image forming units 20 for a total of four colors, yellow (Y), magenta (M), cyan (C), and black (K), are provided. The toner image forming units 20 of the respective colors are disposed in the order of a yellow (Y) toner image forming unit, a magenta (M) toner image forming unit, a cyan (C) toner image forming unit, and a black (K) toner image forming unit from an upstream side toward a downstream side in a transport direction of an intermediate transfer belt 31 (described below). (Y), (M), (C), and (K) shown in FIG. 1 denote structural portions corresponding to the respective colors. Note that, in the description of the specification, (Y), (M), (C), and (K) may be written without the parentheses, that is, as Y, M, C, and K.

Toner Image Forming Units 20

Figure 2:
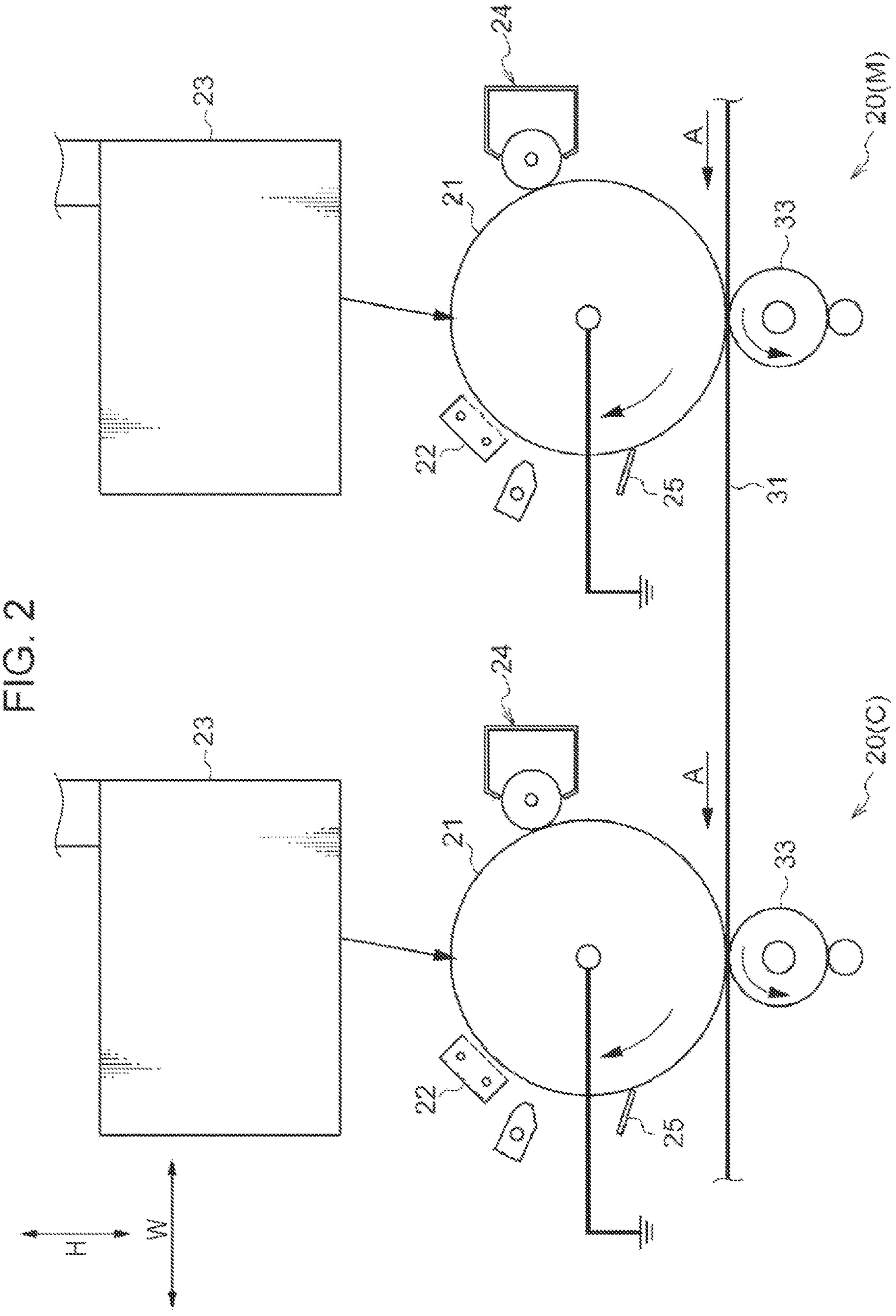
FIG. 2 is a schematic view of a structure of toner image forming units of the image forming apparatus.

The toner image forming units 20 of the respective colors basically have the same structure except in the toner used. Specifically, as shown in FIG. 2, each toner image forming unit 20 of its corresponding color has a photoconductor drum 21 that rotates clockwise in FIG. 2, a charger 22 that charges the photoconductor drum 21, and an exposure device 23 that exposes the photoconductor drum 21 charged by the charger 22 and forms an electrostatic latent image on the photoconductor drum 21. Each toner image forming unit 20 of its corresponding color further has a developing device 24 that develops the electrostatic latent image formed on the photoconductor drum 21 by the exposure device 23 and forms a toner image, and a blade 25 that removes toner remaining on the surface of the photoconductor drum 21 after the toner image has been transferred to the transfer device 30.

Each charger 22 charges, for example, the surface (photosensitive layer) of the photoconductor drum 21 to have a negative polarity. The surface of the photoconductor drum 21 charged to have a negative polarity is such that a portion illuminated with exposure light L by the exposure device 23 has a positive polarity, and the electrostatic latent image is formed on the surface of the photoconductor drum 21. Toner charged by friction to have a negative polarity inside the developing device 24 adheres to the electrostatic latent image having a positive polarity and develops the electrostatic latent image. In this way, a toner image is formed on the surface (outer peripheral surface) of the photoconductor drum 21. The blade 25 contacts the surface of the photoconductor drum 21 and scrapes off toner remaining on the surface of the photoconductor drum 21.

Yellow (Y) toner, magenta (M) toner, cyan (C) toner, and black (K) toner used in the toner image forming units 20Y, 20M, 20C, and 20K (hereunder referred to as the toner image forming units 20Y to 20K) contain a pigment and a binder resin.

Transfer Device 30

In the transfer device 30, the toner images on the photoconductor drums 21 of the respective colors are superimposed upon each other on the intermediate transfer belt 31 and are first-transferred to the intermediate transfer belt 31, and the superimposed toner images are second-transferred to a recording medium P at the second-transfer position NT (an example of a nip). Specifically, as shown in FIG. 1, the transfer device 30 includes the intermediate transfer belt 31 that is an endless belt, first-transfer rollers 33, a second-transfer belt 36 that is an example of a toner transport body that is a transfer member, a cleaning device 35 that cleans a surface of the intermediate transfer belt 31, and the cleaning device 60 that cleans a surface of the second-transfer belt 36 and that is a characteristic portion of the first exemplary embodiment. The cleaning device 60 is described below.

A detector (sensor) 49 for detecting a concentration detection image (patch) and a color misalignment detection image (patch) is disposed at the transfer device 30 so as to be situated downstream (left side in FIG. 1) from the toner image forming unit 20(K).

Intermediate Transfer Belt 31

As shown in FIG. 1, the intermediate transfer belt 31 is an endless belt, and its orientation is determined as a result of the intermediate transfer belt 31 being wound around the rollers 32. In the first exemplary embodiment, the intermediate transfer belt 31 is oriented with an inverted triangular shape having an obtuse angle and being long in the apparatus width direction in front view. Of the rollers 32, a roller 32D shown in FIG. 1 functions as a drive roller that causes the intermediate transfer belt 31 to circulate in the direction of arrow A by drive force of a motor (not shown). The intermediate transfer belt 31 circulates in the direction of arrow A to transport first-transferred images toward the second-transfer position NT.

Of the rollers 32, a roller 32T shown in FIG. 1 functions as a tension applying roller that applies tension to the intermediate transfer belt 31. Of the rollers 32, a roller 32B shown in FIG. 1 functions as an opposing roller of a second-transfer roller 34. An apex portion of a lower end side that forms the obtuse angle of the intermediate transfer belt 31 oriented with the inverted triangular shape having an obtuse angle as described above is wound around the opposing roller 32B. An upper side portion of the intermediate transfer belt 31 extending in the apparatus width direction with the intermediate transfer belt 31 oriented as described above contacts the photoconductor drums 21 of the respective colors from therebelow.

First-Transfer Rollers 33

As shown in FIG. 1, each first-transfer roller 33 is a roller that transfers the toner image on the corresponding photoconductor drum 21 to the intermediate transfer belt 31, and is disposed on an inner side of the intermediate transfer belt 31. Each first-transfer roller 33 is disposed to oppose the photoconductor drum 21 of the corresponding color with the intermediate transfer belt 31 interposed therebetween. A first-transfer voltage having a polarity opposite to the toner polarity is applied to each first-transfer roller 33 by a feeder (not shown). By applying the first-transfer voltage, the toner image formed on each photoconductor drum 21 is transferred to the intermediate transfer belt 31 at a first-transfer position T between the corresponding photoconductor drum 21 and the corresponding first-transfer roller 33.

Second-Transfer Belt 36

Figure 3:
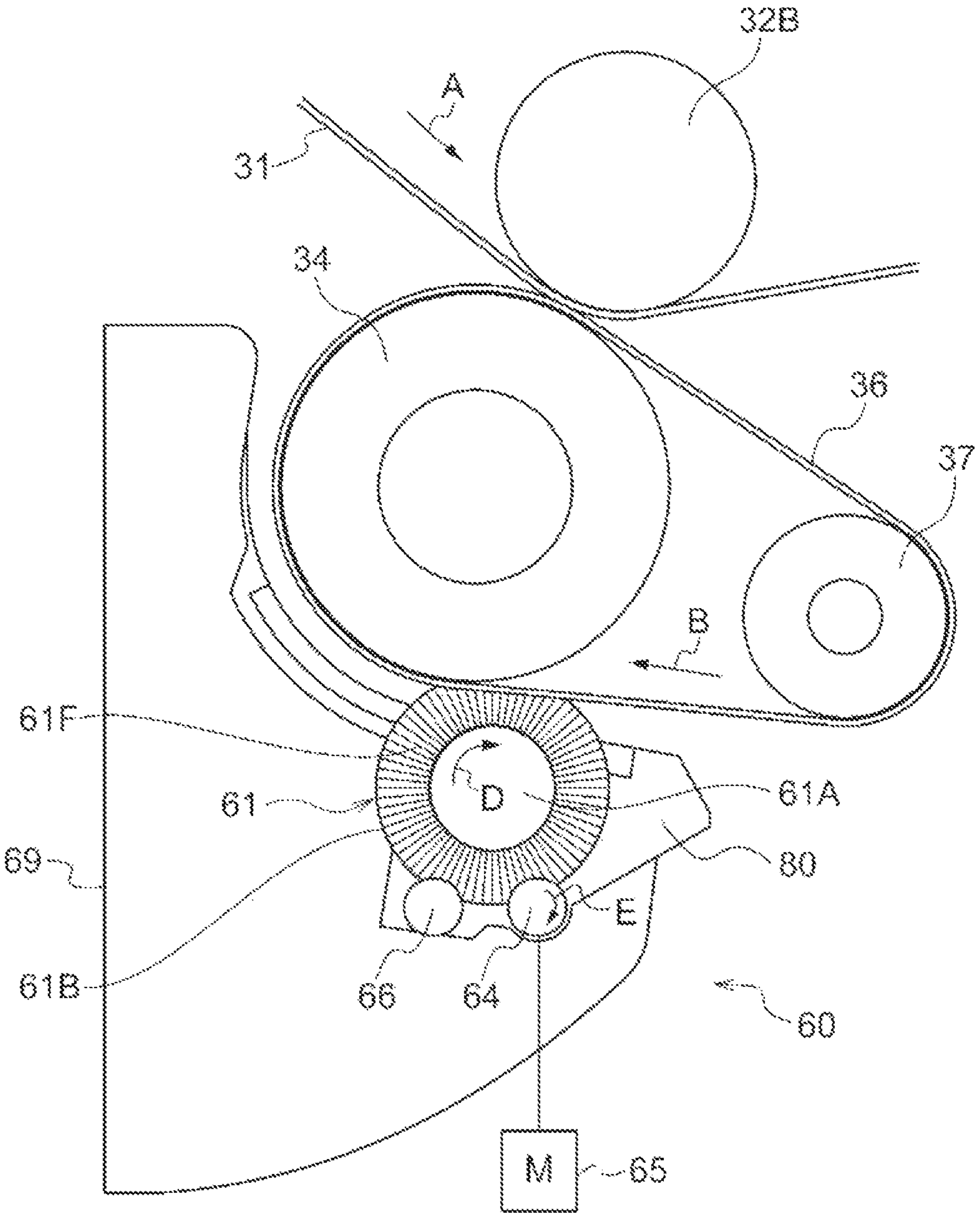
FIG. 3 is a schematic view of a structure of the cleaning device and part of a transfer device according to the first exemplary embodiment.

The second-transfer belt 36 is a belt that transfers to a recording medium P the toner images that have been superimposed upon each other on the intermediate transfer belt 31. As shown in FIGS. 1 and 3, the second-transfer belt 36 is an endless belt and is wound around the second-transfer roller 34 and a driven roller 37.

The second-transfer roller 34 is disposed to nip the intermediate transfer belt 31 and the second-transfer belt 36 between it and the opposing roller 32B, and the second-transfer belt 36 and the intermediate transfer belt 31 are in contact with each other with a predetermined load. A position between the second-transfer belt 36 and the intermediate transfer belt 31 in contact with each other in this way is the second-transfer position NT. A recording medium P is supplied at the appropriate time from the accommodation unit 51 to the second-transfer position NT. The second-transfer belt 36 is circulated and moved in the direction of arrow B (see FIG. 3) by rotationally driving the second-transfer roller 34.

In the first exemplary embodiment, as shown in FIG. 1, when the toner images on the intermediate transfer belt 31 are transferred to a recording medium P, a feeder 39 applies a voltage having a negative polarity to the opposing roller 32B. This causes a potential difference to occur between the opposing roller 32B and the second-transfer roller 34. That is, by applying a voltage having a negative polarity to the opposing roller 32B, a second-transfer voltage (voltage having a positive polarity) opposite to the toner polarity is indirectly applied to the second-transfer roller 34 serving as an opposing electrode of the opposing roller 32B. Therefore, the toner images having a negative polarity are transferred from the intermediate transfer belt 31 to a recording medium P that passes the second-transfer position NT.

On the other hand, when the toner on the intermediate transfer belt 31 is to be held on the intermediate transfer belt 31 when the toner passes the second-transfer position NT, the feeder 39 applies a voltage having a positive polarity to the opposing roller 32B. Therefore, a potential difference occurs between the opposing roller 32B and the second-transfer roller 34. That is, by applying a voltage having a positive polarity to the opposing roller 32B, a non-transfer voltage (voltage having a negative polarity) that is the same as the toner polarity is indirectly applied to the second-transfer roller 34 serving as an opposing electrode of the opposing roller 32B. Therefore, the toner that passes the second-transfer position NT is subjected to a repulsive force from the second-transfer roller 34 and is held by the intermediate transfer belt 31.

Cleaning Device 35 of Intermediate Transfer Belt 31

As shown in FIG. 1, the cleaning device 35 is disposed downstream from the second-transfer position NT and upstream from the first-transfer position T (Y) in a direction of circulation of the intermediate transfer belt 31. The cleaning device 35 includes a scraping blade 351 that scrapes off from a surface of the intermediate transfer belt 31 toner remaining on the surface of the intermediate transfer belt 31.

Operations of Image Forming Apparatus 10

Here, operations of the image forming apparatus 10 are described.

When the controller 70 receives an image formation instruction (print instruction), the controller 70 causes the toner image forming units 20Y to 20K, the transfer device 30, and the fixing device 40 to operate as described below (see FIG. 1).

In each of the toner image forming units 20Y to 20K, the photoconductor drum 21 of the corresponding color is charged by the charger 22 while the photoconductor drum 21 rotates. Each of the charged photoconductor drums 21 is exposed by its corresponding exposure device 23 to form an electrostatic latent image on the surface of each photoconductor drum 21. The electrostatic latent image formed on each photoconductor drum 21 is developed by a developer that is supplied from the corresponding developing device 24. Therefore, a yellow (Y) toner image, a magenta (M) toner image, a cyan (C) toner image, and a black (K) toner image are formed on a corresponding one of photoconductor drums 21Y to 21K for the respective colors.

The toner images of the respective colors formed on the respective photoconductor drums 21 are successively transferred by the respective first-transfer rollers 33 to a transfer region (not shown) of the intermediate transfer belt 31 that circulates.

The toner images transferred to the intermediate transfer belt 31 are transported to the second-transfer position NT by the circulation of the intermediate transfer belt 31.

A recording medium P is supplied to the second-transfer position NT in accordance with a transport timing of the toner images by the transport rollers 52. When the recording medium P and the toner images pass the second-transfer position NT, the second-transfer voltage (voltage having a positive polarity) is applied to the second-transfer roller 34 via the opposing roller 32B. Therefore, the toner images are transferred to the recording medium P from the intermediate transfer belt 31.

The recording medium P to which the toner images have been transferred is transported from the second-transfer position NT toward the fixing device 40 by the transport belts 58, and the toner images on the recording medium P are fixed to the recording medium P at the fixing device 40.

As the toner images that are formed by the toner image forming units 20Y to 20K, there exist transfer images for being transferred to a recording medium P and non-transfer images that are not transferred to the recording medium P. As non-transfer images, there exist, for example, concentration detection images (patches), color misalignment detection images (patches), images (bands) for consuming deteriorated developer (toner), and images (bands) for supplying toner to locations between the photoconductor drums 21 and the respective blades 25.

In the case of ordinary transfer images, the toner images of the respective toner image forming units 20 are transferred to the transfer region (not shown) on the intermediate transfer belt 31 by the respective first-transfer rollers 33. The toner images transferred to the intermediate transfer belt 31 pass, together with the recording medium P, the second-transfer position NT and are transferred to the recording medium P.

At this time, as described above, by applying the second-transfer voltage having a positive polarity (voltage having a polarity opposite to the toner polarity) to the second-transfer roller 34 via the opposing roller 32B, the toner images that, together with the recording medium P, pass the second-transfer position NT are transferred to the recording medium P from the intermediate transfer belt 31.

On the other hand, in the case of non-transfer images, such as patches, the patches of the respective toner image forming units 20 are transferred to a non-transfer region (not shown) on the intermediate transfer belt 31 by the respective first-transfer rollers 33. The patches transferred to the intermediate transfer belt 31 pass singly the second-transfer position NT instead of passing, together with the recording medium P, the second-transfer position NT.

At this time, a non-transfer voltage having a negative polarity (voltage having a polarity that is the same as the toner polarity) is applied to the second-transfer roller 34 via the opposing roller 32B so that the patches on the intermediate transfer belt 31 are held by the intermediate transfer belt 31. Therefore, toner of the patches on the intermediate transfer belt 31 is subjected to a repulsive force from the second-transfer belt 36 (the second-transfer roller 34) and is held by the intermediate transfer belt 31. The toner of the patches held by the intermediate transfer belt 31 is transported to the cleaning device 35 and is removed from the intermediate transfer belt 31 by the cleaning device 35.

Cleaning Device 60 of Second-Transfer Belt 36

Next, the cleaning device 60, which is a characteristic portion of the first exemplary embodiment, is described.

Structure of Cleaning Device 60

As shown in FIG. 3, the cleaning device 60 has a cleaning brush 61 that rotates while in contact with the second-transfer belt 36, and removes toner adhered to the second-transfer belt 36. Note that "removes toner adhered to the belt" means the same as "cleans the belt to which toner is adhered". The second-transfer belt 36 is an example of a toner transport body that is a transfer member, as described above, and an example of a cleaning member to be cleaned.

The cleaning device 60 includes a first contact member 64 that contacts bristles 61F of the cleaning brush 61 and a second contact member 66 that contacts the bristles 61F of the cleaning brush 61 at a location downstream from the first contact member 64 in a direction of rotation of the cleaning brush 61.

Further, the cleaning device 60 includes a housing 69 that accommodates the cleaning brush 61, the first contact member 64, and the second contact member 66.

Cleaning Brush 61

The cleaning brush 61 has a metallic shaft 61A and a brush part 61B provided around the entire outer periphery of the shaft 61A and made of synthetic resin. In the brush part 61B, the bristles 61F extend in a radial direction (outer direction in the radial direction) from the shaft 61A. In the first exemplary embodiment, the lengths of the bristles 61F in the radial direction are the same. End sides of part of the bristles 61F of the brush part 61B contact the second-transfer belt 36.

The cleaning brush 61 rotates due to rotational driving of the shaft 61A at a rotational driving part (not shown). In one example, the cleaning brush 61 rotates in an opposite direction (clockwise direction shown by arrow D in FIG. 3) to a direction of circulation of the second-transfer belt 36 at a contact portion with the second-transfer belt 36.

First Contact Member 64

Figure 4:
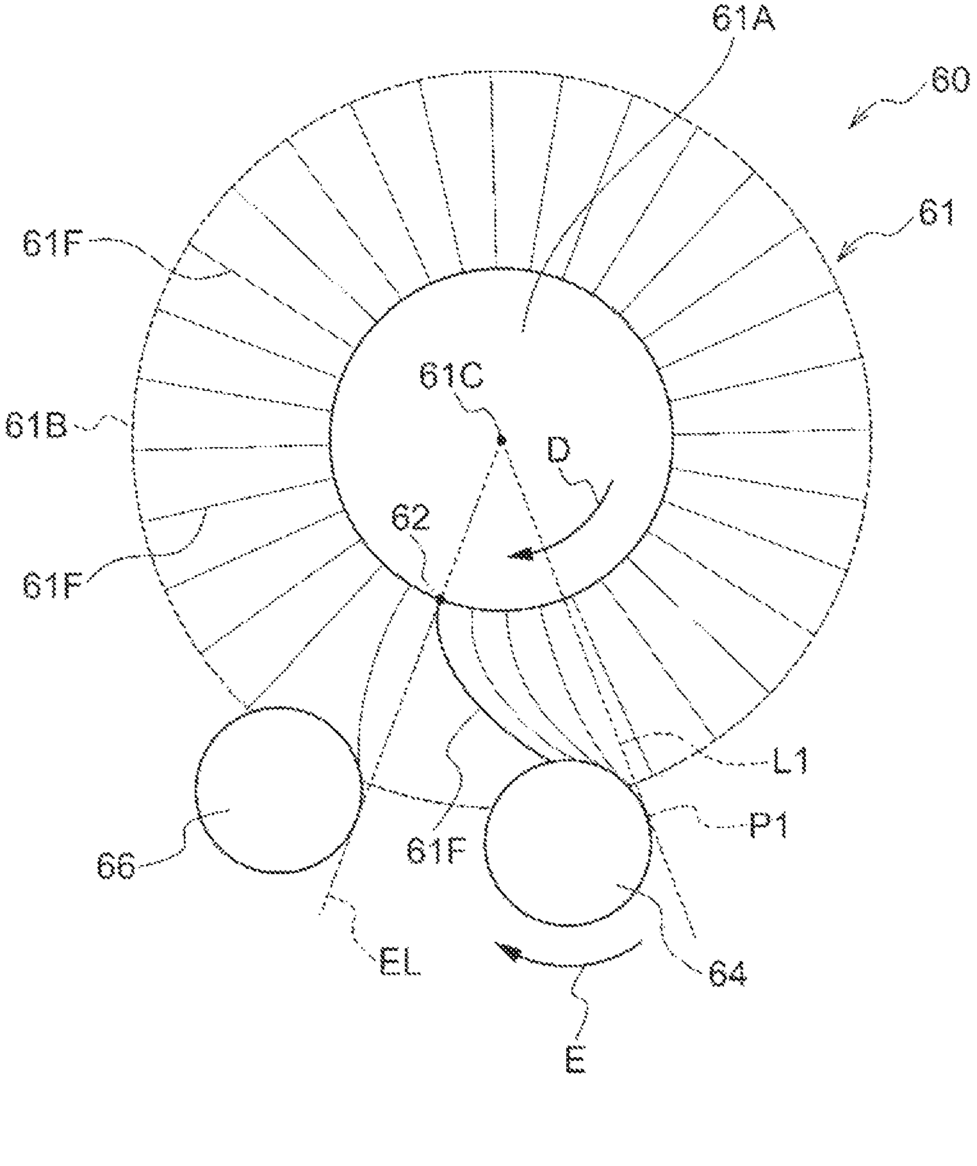
FIG. 4 is a schematic view of a structure of the cleaning device according to the first exemplary embodiment.

As shown in FIGS. 3 and 4, the first contact member 64 contacts the bristles 61F of the cleaning brush 61 without its position relative to the cleaning brush 61 being changed. At least a portion of the first contact member 64 that contacts the bristles 61F has a protruding curved shape along a peripheral direction of the cleaning brush 61. The first contact member 64 is formed from, for example, a columnar member. Note that, for the sake of simplicity, FIGS. 3 and 4 show part of the bristles 61F of the cleaning brush 61.

In the first exemplary embodiment, without the position of an axial center of the first contact member 64 and the position of a center (axial center 61C in FIG. 4) of the shaft 61A of the cleaning brush 61 relative to each other being changed, the first contact member 64 is supported by a support 80 provided at the housing 69.

The cleaning device 60 includes a rotary unit 65 that rotates the first contact member 64. The rotary unit 65 is formed from, for example, a motor. The rotary unit 65 rotates the first contact member 64 so that the direction of rotation of the cleaning brush 61 and the direction of rotation of the first contact member 64 are opposite to each other at a portion where the first contact member 64 and the cleaning brush 61 oppose each other. That is, the first contact member 64 rotates in a clockwise direction shown by arrow E. The first contact member 64 is rotatably supported by the support 80 via a bearing (not shown).

In one example, the interference of the bristles 61F of the cleaning brush 61 is smaller than the radius of the first contact member 64. The bristles 61F of the cleaning brush 61 contact an outer peripheral surface of the first contact member 64 in a region that is narrower than half (semicircle) of the outer peripheral surface of the first contact member 64. In other words, an end of each bristle 61F is disposed closer to the axial center 61C of the cleaning brush 61 than a contact point P1 of a tangential line L1 extended to the first contact member 64 from the axial center 61C of the shaft 61A of the cleaning brush 61. By forming the first contact member 64 from a columnar member, when toner adheres to the outer peripheral surface of the first contact member 64, the toner may easily fall from the outer peripheral surface of the first contact member 64.

Second Contact Member 66

As shown in FIGS. 3 and 4, the second contact member 66 contacts the bristles 61F of the cleaning brush 61 without its position relative to the cleaning brush 61 being changed. At least a portion of the second contact member 66 that contacts the bristles 61F has a protruding curved shape along the peripheral direction of the cleaning brush 61. The second contact member 66 is formed from, for example, a columnar member. Although, in one example, the outside diameter of the second contact member 66 is the same as the outside diameter of the first contact member 64, the outside diameter of the second contact member 66 may differ from the outside diameter of the first contact member 64.

In the first exemplary embodiment, without the position of an axial center of the second contact member 66 and the position of the axial center 61C of the cleaning brush 61 relative to each other being changed, the second contact member 66 is supported by the support 80 provided at the housing 69.

In the first exemplary embodiment, the second contact member 66 does not rotate. By forming the second contact member 66 from a columnar member, when toner adheres to an outer peripheral surface of the second contact member 66, the toner may easily fall from the outer peripheral surface of the second contact member 66.

As shown in FIG. 4, the second contact member 66 is disposed on an extension line EL extended from a line between the axial center 61C of the cleaning brush 61 and a base 62 of the bristles 61F that move away from the first contact member 64. In the first exemplary embodiment, the extension line EL extended from the line between the axial center 61C of the cleaning brush 61 and the base 62 of the bristles 61F that move away from the first contact member 64 is a tangential line that contacts the outer peripheral surface of the second contact member 66.

In the first exemplary embodiment, the amount of interference of the second contact member 66 with the bristles 61F of the cleaning brush 61 is the same as the amount of interference of the first contact member 64 with the bristles 61F of the cleaning brush 61.

Housing 69

The housing 69 includes a recessed portion that accommodates the cleaning brush 61, the first contact member 64, and the second contact member 66. The cleaning brush 61, the first contact member 64, and the second contact member 66 are disposed on an upper side in a vertical direction of the housing 69. Therefore, toner that has fallen from the cleaning brush 61, the first contact member 64, and the second contact member 66 is retained in the recessed portion of the housing 69.

As described above, the housing 69 includes the support 80 that supports the first contact member 64 and the second contact member 66. The support 80 is electrically insulated.

Operations and Effects of First Exemplary Embodiment

Next, the operations and effects of the first exemplary embodiment are described.

In the image forming apparatus 10 shown in FIG. 1, when patches, which are non-transfer images, are to be formed on a surface of the intermediate transfer belt 31, although a non-transfer voltage is applied, the second-transfer belt 36 and the intermediate transfer belt 31 are in contact with each other with a predetermined load. Therefore, part of the toner of the patches on the surface of the intermediate transfer belt 31 may be transferred to the second-transfer belt 36 even if the part of the toner is subjected to an electrostatically repulsive force. Therefore, the toner adheres to the second-transfer belt 36.

Even if toner images, which are transfer images, are to be formed on the surface of the intermediate transfer belt 31, part of the toner images on the surface of the intermediate transfer belt 31 may adhere to the second-transfer belt 36 without being transferred to a recording medium P.

As shown in FIG. 3, the toner adhered to the second-transfer belt 36 is transported toward the cleaning device 60 due to the circulation of the second-transfer belt 36. The cleaning device 60 includes the cleaning brush 61 that rotates while in contact with the second-transfer belt 36, and the toner adhered to the surface of the second-transfer belt 36 is removed by the cleaning brush 61. For example, the toner is attracted to the cleaning brush 61 by static electricity or the like.

For example, when the toner removed by the cleaning brush 61 is accumulated or retained inside the cleaning brush 61, a toner removal performance of the cleaning brush 61 may be reduced and a back surface of the recording medium P may be stained by the toner.

Figure 5A:
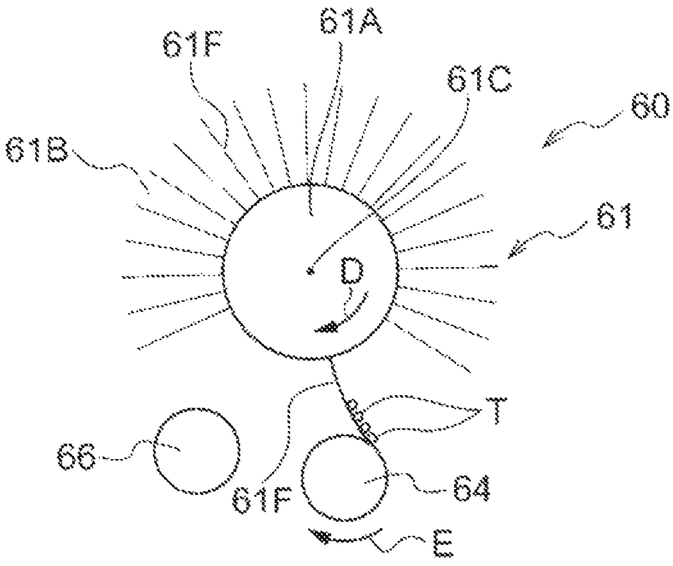
FIGS. 5A, 5B, and 5C are schematic views showing in order the steps of removing toner from a cleaning brush of the cleaning device according to the first exemplary embodiment.
Figure 5B:
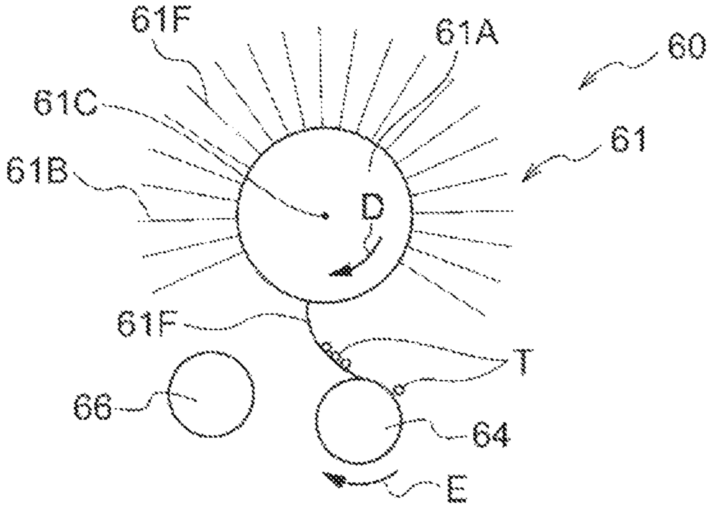
Figure 5C:
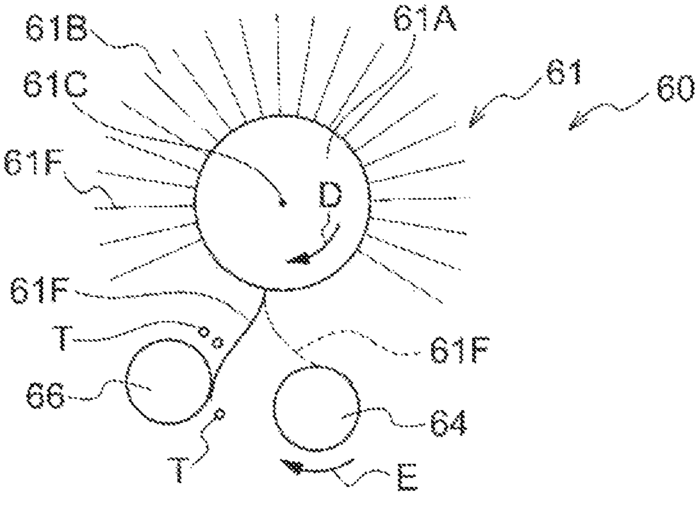

FIGS. 5A to 5C show the steps of removing the toner attracted to the cleaning brush 61 in the cleaning device 60. For the sake of simplifying the process of removing toner T on the bristles 61F of the cleaning brush 61, FIGS. 5A to 5C show part of the bristles 61F of the cleaning brush 61.

As shown in FIG. 5A, due to the cleaning brush 61 rotating in the direction of arrow D, the end sides of the bristles 61F of the cleaning brush 61, after moving away from the second-transfer belt 36, contact the first contact member 64 (see FIG. 3). The toner T is attracted to the bristles 61F of the cleaning brush 61.

As shown in FIG. 5B, due to the cleaning brush 61 rotating in the direction of arrow D and the first contact member 64 rotating in the opposite direction (direction of arrow E) at a portion of the first contact member 64 that contacts the cleaning brush 61, the bristles 61F of the cleaning brush 61 contact the first contact member 64 and are flexed. Then, due to the rotation of the cleaning brush 61 and the first contact member 64, the flexing of the bristles 61F is gradually increased.

As shown in FIG. 5C, due to the cleaning brush 61 further rotating in the direction of arrow D and the first contact member 64 further rotating in the opposite direction (direction of arrow E) to the direction of rotation of the cleaning brush 61, the end sides of the bristles 61F of the cleaning brush 61 move away from the first contact member 64, and the end sides of the bristles 61F of the cleaning brush 61 contact the second contact member 66 while the bristles 61F are being restored from their flexed states. Note that "while the bristles 61F are being restored from their flexed states (that is, during the restoration from the flexed state)" means the same as "during a releasing operation of releasing the bristles 61F from their flexed states". At this time, due to the bristles 61F of the cleaning brush 61 contacting the second contact member 66, an impact force that acts upon the bristles 61F is increased and the toner T falls from the bristles 61F. That is, due to a large impact force being produced at the bristles 61F, the toner T is shaken off from the bristles 61F.

Figure 7A:
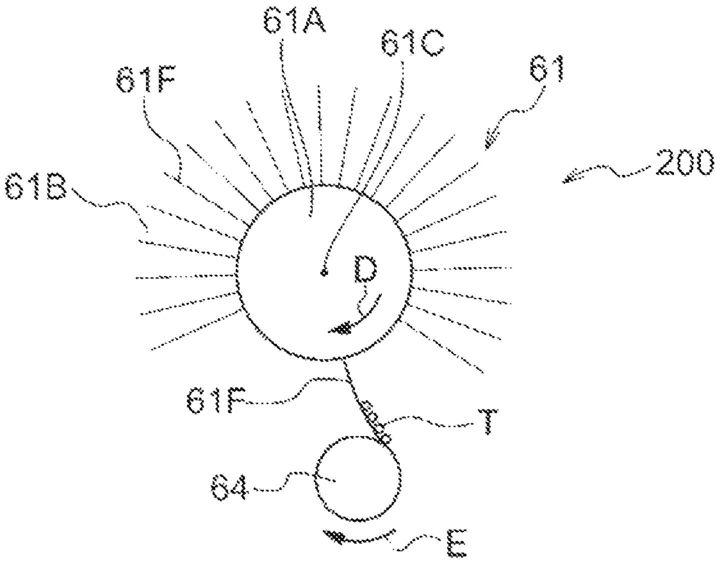
FIGS. 7A, 7B, and 7C are schematic views showing in order the steps of removing toner from a cleaning brush of a cleaning device according to a comparative example.
Figure 7B:
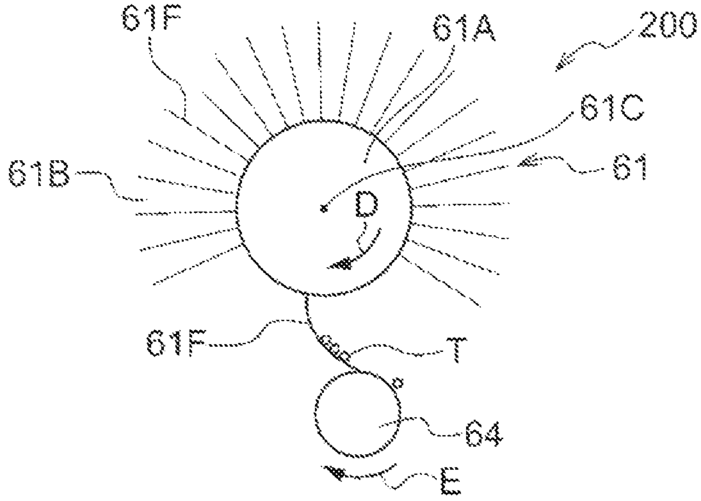
Figure 7C:
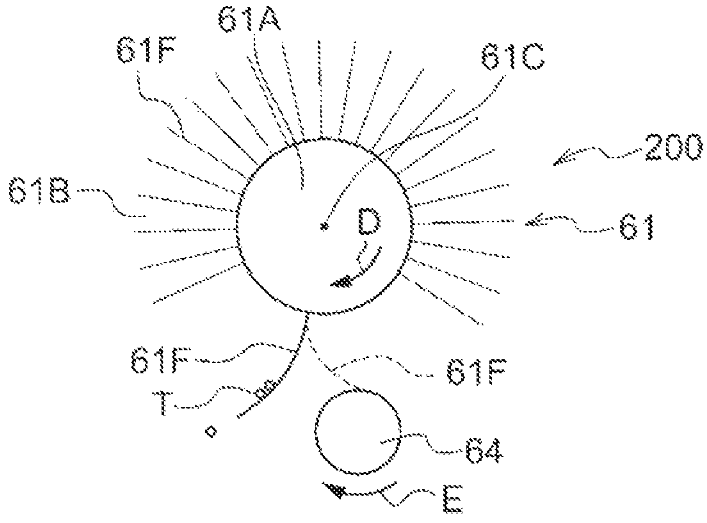

Here, a cleaning device 200 of a comparative example is described by using FIGS. 7A to 7C.

As shown in FIGS. 7A to 7C, the cleaning device 200 of the comparative example includes a cleaning brush 61 and a first contact member 64 that contacts the cleaning brush 61. The cleaning device 200 of the comparative example does not include a second contact member 66 such as that of the cleaning device 60 of the first exemplary embodiment.

The other structures of the cleaning device 200 are the same as those of the cleaning device 60 of the first exemplary embodiment.

As shown in FIG. 7A, due to the cleaning brush 61 rotating in the direction of arrow D, end sides of bristles 61F of the cleaning brush 61 contact the first contact member 64.

As shown in FIG. 7B, due to the cleaning brush 61 rotating in the direction of arrow D and the first contact member 64 rotating in the opposite direction (direction of arrow E) at a portion of the first contact member 64 that contacts the cleaning brush 61, the bristles 61F of the cleaning brush 61 contact the first contact member 64 and are flexed, and the flexing of the bristles 61F is gradually increased.

As shown in FIG. 7C, due to the cleaning brush 61 further rotating in the direction of arrow D and the first contact member 64 further rotating in the opposite direction (direction of arrow E) to the direction of rotation of the cleaning brush 61, the end sides of the bristles 61F of the cleaning brush 61 move away from the first contact member 64, and the bristles 61F are restored from their flexed states. When the bristles 61F are restored from their flexed states, part of toner T falls from the bristles 61F.

In the cleaning device 200 of the comparative example, the end sides of the bristles 61F of the cleaning brush 61 move away from the first contact member 64, and the bristles 61F do not contact any other member while the bristles 61F are being restored from the flexed states. Therefore, a large impact force does not act upon the bristles 61F of the cleaning brush 61 and the toner T is less likely to separate from the bristles 61F.

In contrast, as shown in FIG. 3, the cleaning device 60 of the first exemplary embodiment includes the second contact member 66 that contacts the bristles 61F of the cleaning brush 61 at a location downstream from the first contact member 64 in the direction of rotation of the cleaning brush 61. The second contact member 66 is disposed on the extension line EL extended from the line between the axial center 61C of the cleaning brush 61 and the base 62 of the bristles 61F of the cleaning brush 61 when the bristles 61F move away from the first contact member 64. Therefore, as shown in FIGS. 5B and 5C, the end sides of the bristles 61F of the cleaning brush 61 move away from the first contact member 64, and the end sides of the bristles 61F of the cleaning brush 61 contact the second contact member 66 while the bristles 61F are being restored from their flexed states. Consequently, an impact force that acts upon the bristles 61F is increased and the toner T may easily fall from the bristles 61F. Thus, the toner T may less likely be accumulated or retained inside the cleaning brush 61.

Therefore, compared with a structure in which the bristles of the cleaning brush, after being restored from their deformed states resulting from contact with the upstream contact member, contact the downstream contact member, the cleaning device 60 may be capable of suppressing a reduction in removal performance of the toner T.

In the cleaning device 60, at least a portion of the first contact member 64 that contacts the bristles 61F of the cleaning brush 61 and at least a portion of the second contact member 66 that contacts the bristles 61F of the cleaning brush 61 each have a protruding curved shape along the peripheral direction of the cleaning brush 61.

Therefore, compared with a structure in which the first contact member and the second member each have a rectangular shape, in the cleaning device 60, the bristles 61F may be easily flexed when the bristles 61F contact the first contact member 64 and the second contact member 66 due to the rotation of the cleaning brush 61.

In the cleaning device 60, at least one of the first contact member 64 and the second contact member 66 is a columnar member.

Therefore, compared with when only part of the first contact member and only part of the second contact member each have a circular shape, in the cleaning device 60, the first contact member 64 and the second contact member 66 may be easily positioned.

In the cleaning device 60, the first contact member 64 is a columnar member, and the rotary unit 65 that rotates the first contact member 64 is provided. The direction of rotation of the cleaning brush 61 and the direction of rotation of the first contact member 64 are opposite to each other at the portion where the first contact member 64 and the cleaning brush 61 oppose each other.

Therefore, compared with when the first contact member, which is a columnar member, is fixed, in the cleaning device 60, the toner T may be easily removed from the bristles 61F of the cleaning brush 61.

In the cleaning device 60, the first contact member 64 is a columnar member, and the interference of the bristles 61F of the cleaning brush 61 is smaller than the radius of the first contact member 64.

Therefore, compared with when the interference of the bristles of the cleaning brush is larger than the radius of the columnar member, in the cleaning device 60, the impact produced when the bristles 61F of the cleaning brush 61 move away from the first contact member 64 and strike the second contact member 66 may be increased.

In the cleaning device 60, the amount of interference of the second contact member 66 with the bristles 61F is equal to the amount of interference of the first contact member 64 with the bristles 61F.

Therefore, in the cleaning device 60, the flexing amount of the bristles 61F when the first contact member 64 has contacted the bristles 61F is greater than or equal to the flexing amount of the bristles 61F when the second contact member 66 has contacted the bristles 61F. Consequently, compared with when the amount of interference of the second contact member with the bristles is larger than the amount of interference of the first contact member with the bristles, the impact produced when the bristles 61F that have been brought out of contact with the first contact member 64 strike the second contact member 66 may be increased.

In the cleaning device 60, the support 80 that supports the first contact member 64 and the second contact member 66 is electrically insulated.

Therefore, compared with when the support that supports the first contact member and the second contact member is charged, in the cleaning device 60, charged toner may be suppressed from adhering to the first contact member 64 and the second contact member 66 from the support 80.

The image forming apparatus 10 includes a cleaning device 60 that cleans off the toner T adhered to the second-transfer belt 36.

Therefore, compared with a structure in which the bristles of the cleaning brush, after being restored from their deformed states resulting from contact with the upstream contact member, contact the downstream contact member, the image forming apparatus 10 may suppress soiling of a recording medium P by the toner T.

SECOND EXEMPLARY EMBODIMENT

Next, an image forming apparatus including a cleaning device of a second exemplary embodiment is described.

Note that structural parts that are the same as those of the first exemplary embodiment above are given the same reference numerals and are not described below.

Figure 6:
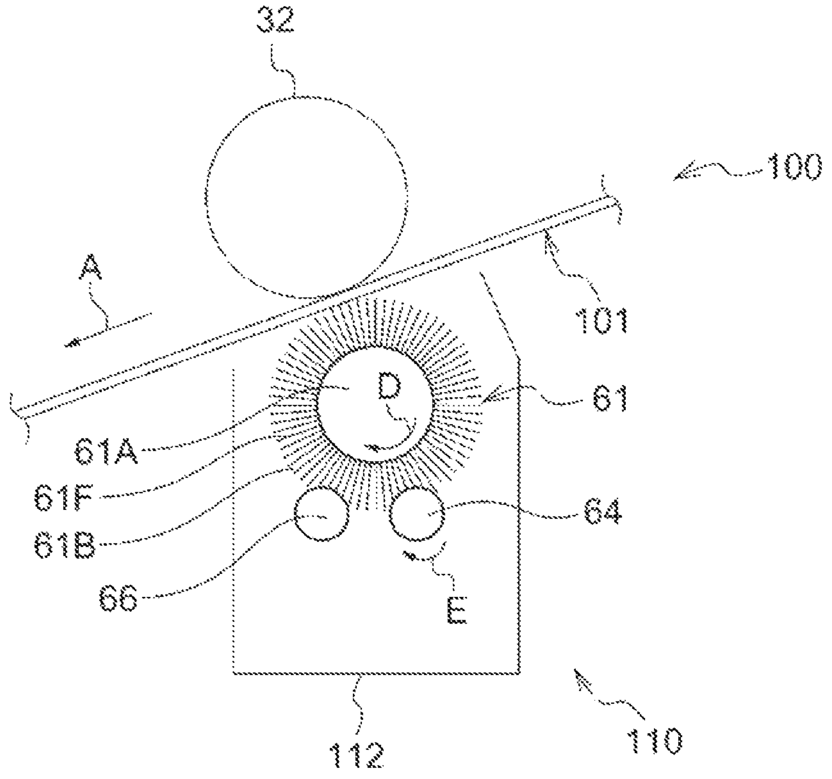
FIG. 6 is a schematic view of a structure of a characteristic portion of an image forming apparatus including a cleaning device according to a second exemplary embodiment.

FIG. 6 shows part of an image forming apparatus 100 including a cleaning device 110. As shown in FIG. 6, the image forming apparatus 100 includes an intermediate transfer belt 101 to which toner images of toner image forming units (not shown) are transferred. Although, in the first exemplary embodiment, the cleaning device 60 is used to clean the second-transfer belt 36, in the second exemplary embodiment, a cleaning device 110 that cleans the intermediate transfer belt 101 is provided. The intermediate transfer belt 101 is an example of a toner transport body that is a toner carrying member that carries toner images.

The cleaning device 110 includes a cleaning brush 61, a first contact member 64, and a second contact member 66. The cleaning device 110 further includes a housing 112 that accommodates the cleaning brush 61, the first contact member 64, and the second contact member 66. The other structures are the same as those of the cleaning device 60 of the first exemplary embodiment.

The cleaning device 110 can provide the same effects as a result of having the same structure as that of the cleaning device 60 of the first exemplary embodiment.

Others

Although the first and second exemplary embodiments have been described, the present disclosure is not limited to the above. Naturally, various modifications are possible within a scope that does not depart from the spirit of the present disclosure.

For example, in the case of a structure that is an image forming apparatus that does not include a second-transfer belt 36 and that nips a recording medium P between the second-transfer roller 34 and the intermediate transfer belt 31, the second-transfer roller 34 becomes the toner transfer body of the present disclosure. In this case, although not shown, the cleaning device 60 or the cleaning device 110 is to oppose the second-transfer roller 34, to thereby make it possible to clean off the toner adhered to the second-transfer roller 34 by the cleaning device 60 or the cleaning device 110.

Although, in the first and second exemplary embodiments, the extension line EL extended from the line between the axial center 61C of the cleaning brush 61 and the base 62 of the bristles 61F that move away from the first contact member 64 contacts the outer peripheral surface of the second contact member 66, the present disclosure is not limited to this structure. For example, the first contact member 64 may be disposed in a region that overlaps the extension line EL extended from the line between the axial center 61C of the cleaning brush 61 and the base 62 of the bristles 61F that move away from the first contact member 64.

In the first and second exemplary embodiments, at the portion where the cleaning brush 61 contacts the second-transfer belt 36 or the intermediate transfer belt 101, the cleaning brush 61 may be rotated in the same direction as the direction of circulation of the second-transfer belt 36 or the intermediate transfer belt 101. In this case, for example, the cleaning brush 61 may be configured to rotate with a peripheral speed differing from the peripheral speed of the second-transfer belt 36 or the intermediate transfer belt 101.

Although, in the first and second exemplary embodiments, the second contact member 66 is configured so as not to rotate, a rotary unit that rotates the second contact member 66 may be provided. When the second contact member 66 is to be rotated, the second contact member 66 may be configured so that the direction of rotation of the cleaning brush 61 and the direction of rotation of the second contact member 66 are opposite to each other at the portion where the second contact member 66 and the cleaning brush 61 oppose each other. Compared with when the second contact member, which is a columnar member, is fixed, such a structure may make it easier for toner to be removed from the bristles 61F of the cleaning brush 61.

Although, in the first and second exemplary embodiments, the first contact member 64 and the second contact member 66 are each a columnar member, the present disclosure is not limited to such a structure. For example, when the second contact member 66 is not to be rotated, a portion of the second contact member 66 that contacts the bristles 61F of the cleaning brush 61 may have a semicircular shape or a protruding curved fan shape along the peripheral direction of the cleaning brush 61.

Although, in the first and second exemplary embodiments, the first contact member 64 is rotated, the first contact member 64 may be configured so as not to rotate. In this case, a portion of the first contact member 64 that contacts the bristles 61F of the cleaning brush 61 may have a semicircular shape or a protruding curved fan shape along the peripheral direction of the cleaning brush 61.

Although, in the first and second exemplary embodiments, the amount of interference of the second contact member 66 with the bristles 61F of the cleaning brush 61 is the same as the amount of interference of the first contact member 64 with the bristles 61F of the cleaning brush 61, the present disclosure is not limited to such a structure. For example, the amount of interference of the second contact member 66 with the bristles 61F of the cleaning brush 61 may be smaller than the amount of interference of the first contact member 64 with the bristles 61F of the cleaning brush 61. In such a structure, the flexing amount of the bristles 61F when the first contact member 64 has contacted the bristles 61F is greater than or equal to the flexing amount of the bristles 61F when the second contact member 66 has contacted the bristles 61F. Therefore, compared with when the amount of interference of the second contact member with the bristles is greater than the amount of interference of the first contact member with the bristles, the impact produced when the bristles 61F brought out of contact with the first contact member 64 strike the second contact member 66 may be capable of being increased.

Although, in the first and second exemplary embodiments, a voltage is not applied to the cleaning brush 61, a feeder that applies a bias voltage having a positive polarity to the shaft 61A of the cleaning brush 61A may be provided. Therefore, such a structure in which the cleaning brush 61 rotates while in contact with a cleaning member to be cleaned may be capable of attracting toner to the cleaning brush 61 from the cleaning member to be cleaned.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A cleaning device comprising:

a cleaning brush that has a plurality of bristles that rotate and contact a surface, to which toner has adhered, of a cleaning member to be cleaned, the cleaning brush removing the toner adhered to the surface of the cleaning member;

a first contact member that contacts the bristles without a position of the first contact member relative to a position of the cleaning brush being changed; and a second contact member that contacts the bristles at a location downstream from the first contact member in a direction of rotation of the cleaning brush and without a position of the second contact member relative to the position of the cleaning brush being changed, the second contact member being disposed on an extension line extended from a line from an axial center of the cleaning brush to a base of a first bristle, and the first contact member being positioned so as to contact the first bristle whose base is simultaneously at the extension line on which the second contact member is disposed.

2. The cleaning device according to claim 1, wherein at least a portion of the first contact member that contacts the bristles and at least a portion of the second contact member that contacts the bristles each have a protruding curved shape along a peripheral direction of the cleaning brush.

3. The cleaning device according to claim 2, wherein at least one of the first contact member and the second contact member is a columnar member.

4. The cleaning device according to claim 3, wherein the first contact member is the columnar member, wherein the cleaning device includes a rotary unit that rotates the columnar member, and wherein the direction of rotation of the cleaning brush and a direction of rotation of the columnar member are opposite to each other at a portion of the columnar member that opposes the cleaning brush.

5. The cleaning device according to claim 3, wherein the second contact member is the columnar member, wherein the cleaning device includes a rotary unit that rotates the columnar member, and wherein the direction of rotation of the cleaning brush and a direction of rotation of the columnar member are opposite to each other at a portion of the columnar member that opposes the cleaning brush.

6. The cleaning device according to claim 4, wherein the second contact member is the columnar member, wherein the cleaning device includes a rotary unit that rotates the columnar member, and wherein the direction of rotation of the cleaning brush and a direction of rotation of the columnar member are opposite to each other at a portion of the columnar member that opposes the cleaning brush.

7. The cleaning device according to claim 3, wherein the first contact member is the columnar member, and wherein interference of the bristles is smaller than a radius of the columnar member.

8. The cleaning device according to claim 4, wherein the first contact member is the columnar member, and wherein interference of the bristles is smaller than a radius of the columnar member.

9. The cleaning device according to claim 1, wherein an amount of interference of the second contact member with the bristles is smaller than an amount of interference of the first contact member with the bristles, or is equal to the amount of interference of the first contact member with the bristles.

10. The cleaning device according to claim 2, wherein an amount of interference of the second contact member with the bristles is smaller than an amount of interference of the first contact member with the bristles, or is equal to the amount of interference of the first contact member with the bristles.

11. The cleaning device according to claim 3, wherein an amount of interference of the second contact member with the bristles is smaller than an amount of interference of the first contact member with the bristles, or is equal to the amount of interference of the first contact member with the bristles.

12. The cleaning device according to claim 4, wherein an amount of interference of the second contact member with the bristles is smaller than an amount of interference of the first contact member with the bristles, or is equal to the amount of interference of the first contact member with the bristles.

13. The cleaning device according to claim 5, wherein an amount of interference of the second contact member with the bristles is smaller than an amount of interference of the first contact member with the bristles, or is equal to the amount of interference of the first contact member with the bristles.

14. The cleaning device according to claim 6, wherein an amount of interference of the second contact member with the bristles is smaller than an amount of interference of the first contact member with the bristles, or is equal to the amount of interference of the first contact member with the bristles.

15. The cleaning device according to claim 7, wherein an amount of interference of the second contact member with the bristles is smaller than an amount of interference of the first contact member with the bristles, or is equal to the amount of interference of the first contact member with the bristles.

16. The cleaning device according to claim 8, wherein an amount of interference of the second contact member with the bristles is smaller than an amount of interference of the first contact member with the bristles, or is equal to the amount of interference of the first contact member with the bristles.

17. The cleaning device according to claim 1, wherein a support that supports the first contact member and the second contact member is electrically insulated.

18. The cleaning device according to claim 2, wherein a support that supports the first contact member and the second contact member is electrically insulated.

19. The cleaning device according to claim 3, wherein a support that supports the first contact member and the second contact member is electrically insulated.

20. An image forming apparatus comprising:

a toner transport body that is a toner carrying member that carries a toner image or that is a transfer member that transfers the toner image to a recording medium nipped between the toner carrying member and the transfer member; and the cleaning device according to claim 1 that cleans off toner adhered to a surface of the toner transport body.

* * * * *